Patented Jan. 9, 1934

1,942,853

UNITED STATES PATENT OFFICE 1,942,853

RUBBER MASTER BATCH AND METHOD OF MAKING THE SAME

William F. Zimmerli, Portage Township, Summit County, and Waldo L. Semon, Cuyahoga Falls, Ohio, assignors to The B. F. Goodrich Company, New York, N. Y., a corporation of New York No Drawing. Application August 22, 1928
Serial No. 301,420

10 Claims. (Cl. 106—23)

This invention relates to the art of preparing rubber compositions, and particularly rubber compositions containing large proportions of oil or similar rubber-softening materials.

Heretofore it has been customary to incorporate either fatty or mineral oils, or similar heavy-bodied materials capable of swelling rubber such as waxes, tars, etc. into rubber, chiefly for the purpose of softening the unvulcanized rubber and rendering it readily workable on the calender or in the tubing machine, but also to some extent in preparing "soft" and lively vulcanized rubber. Such materials, which are generally known as rubber softeners, are, however, somewhat difficult to incorporate into rubber by the usual method of breaking down the crude rubber to a plastic condition and adding the softener to the rubber in small quantities on the mill. The liquid oils in particular, if added too rapidly, run off the end of the mill and are lost, or cause the rubber sheet to break on the mill, or lubricate the mill rollers so effectively that the rubber is not drawn between the rollers. Furthermore any considerable quantities of oil added by this method cause the unvulcanized rubber composition to become so tacky as to make handling very difficult, and soften it almost to the point of fluidity.

The object of this invention is to provide a method of incorporating oils and similar materials into rubber, which obviates the difficulties hereinabove mentioned, and which gives a product which is substantially not tacky but is stiff enough to be handled readily in the unvulcanized state. A further object is to provide unvulcanized or vulcanized rubber compositions of a useful character, comprising a large proportion of oil or other softeners.

This invention, in brief, consists in subjecting crude rubber, substantially without mastication, to the action of a rubber softener, such as a mineral oil, and permitting the rubber to absorb the desired amount of the softener. The product so obtained, although softer than the untreated crude rubber, notably lacks the extreme softness and tackiness characteristic of rubber into which softeners have been incorporated by milling. If it is desired further to add sulphur, accelerators, fillers, etc. for the purpose of preparing a vulcanizable composition, the peculiar softness combined with the absence of tackiness, permits the ready incorporation of such materials on a cold mill, requiring very little time and power to break down the rubber. Oil-containing compositions so prepared may be vulcanized in any customary manner, such as in a press, the vulcanized rubber being characterized by a liveliness and a soft velvety texture unknown prior to this invention. The oil-containing rubber prepared by the method of this invention may also be used as an oil masterbatch, the oil-treated rubber being mixed with untreated crude rubber as a convenient means of introducing a small proportion of oil. The addition of whatever oil or other softener is required in a rubber composition in the form of a master batch which may be mixed with the remainder of the rubber during the breaking down or mastication thereof, reduces remarkably the time and power consumption of normal mastication, and results in a product the nerve and liveliness of which has not been injured by excessive mastication.

This invention may be practiced in any one of a variety of ways, all of which possess the essential common feature that a substantially homogeneous product is obtained by allowing the rubber to absorb the oil or similar product substantially without mastication. For example, crude rubber such as first latex or smoked sheet is creped to a thickness of about 1/16" on a cold mill. 50 pounds of this rubber and 50 pounds of mineral oil are weighed separately. The sheets of rubber are separately dipped in the oil in such a manner that the surface of the rubber is thoroughly wetted by the oil, and are placed in a large can. Any excess of oil, not used up by the dipping, is poured over the rubber in the can and the mixture is allowed to stand for several days to permit substantially uniform absorption of the oil by the rubber. The oil-swelled rubber is then removed from the can, sheeted out on a roll mill between tight cold rolls, and rolled on itself. The product is a lively rubber, which noticeably lacks the extreme softness and tackiness characteristic of masticated rubber containing even much smaller proportions of oil. If desired smaller or even much larger proportions of oil may be used. One part of rubber swelled in four parts of oil gives a product which it still stiff enough to permit handling. However, it is found that it is more difficult to prepare, by the preferred method of this invention, compositions containing only a small proportion of softeners, since it becomes more difficult to distribute the softener over the entire surface of the rubber in such a manner that the product of the absorption thereof is substantially homogeneous. The preferred proportions are therefore from about ½ to 3 parts of the ordinary liquid softeners to 1 part of rubber. In case smaller proportions of softener are desired in a composition it will usually be most convenient to prepare a master-batch containing say equal parts of rubber and softener and blend the master-batch by milling or otherwise with the remainder of the rubber required to prepare the desired composition. If it is not convenient to sheet the rubber to the thickness of 1/16" or less which is recommended, thicker sheets or even blocks may be swelled in the oil or other softener, but a much longer time must be allowed for thorough absorption and penetration if thicker sheets are used. Other means of applying the softener than immersion therein may be found convenient. For example, the liquid softener may be sprayed on the rubber, or spread over the surface thereof, as by brushing.

Softeners which are solids at room temperature such as tars and resins may be applied in a molten state or in the form of a solution in a volatile solvent, but if heat is used to accelerate the absorption, the temperature and the time of treatment should be so regulated that the product is not excessively softened.

Obviously the invention is susceptible of numerous modifications, either in the substances used or in the procedure followed. Any animal or vegetable oil or mineral oil, fatty acid, grease, wax, resin, tar, pitch, ester, etc. which is capable of swelling rubber, such materials being known to those skilled in the art as "softeners", may be incorporated therein by the methods of this invention, and with the production of an article superior in quality to that produced by mill-mixing.

In addition to the oils and similar products added to rubber as softeners, many of the accelerators and age-resisters which are used in rubber compositions are viscous liquids or resins which possess the property of swelling rubber. Many of these substances, which are normally added to rubber in the form of a master-batch, are difficult to mill into rubber, because of their lubricating action, and soften the rubber to such an extent that the master-batches slowly flow away during the storage before use. Such master-batches are readily prepared by the method of this invention, and the products do not flow and are sufficiently stiff to be handled readily.

Although it is preferable to employ unmasticated crude rubber in the practice of this invention, synthetic rubber, or reclaimed rubber or rubber containing sulfur, accelerators, fillers, etc. may be substituted therefor. However, the employment of masticated or plasticized new or reclaimer rubber will result in a product not possessing to the fullest extent the beneficial qualities imparted by the practice of this invention in its preferred form.

The degree of mastication which rubber normally undergoes at the plantation during the washing, sheeting, creping, etc. has been found not to affect the quality of the products of this invention, but any further breaking down of the rubber is objectionable, since it results in a soft and sticky product being formed when the softener is absorbed therein, and it may necessitate a considerable reduction in the amount of softener which may conveniently be added. Any working of the rubber which may be necessary before absorbing the softener therein should be done hot in order to minimize as far as possible the breaking down of the structure of the rubber.

The term "softener" is employed in the claims in a generic sense to include substances in general which are capable of being absorbed by, and of swelling, rubber, especially such as are substantially non-volatile liquids or have a low melting point.

We claim:

1. The method of preparing rubber compositions which comprises incorporating from 1/2 to 3 parts of a softener into 1 part of rubber, applying the softener to the surface of the substantially unmasticated crude rubber, and permitting the absorption thereof by the rubber.

2. The method of preparing rubber compositions which comprises incorporating from 1/2 to 3 parts of a liquid softener into 1 part of rubber, applying the softener to the surface of the substantially unmasticated crude rubber, and permitting the rubber to absorb the softener.

3. The method of preparing rubber compositions which comprises incorporating from 1/2 to 3 parts of a mineral oil into 1 part of rubber, treating the substantially unmasticated crude rubber with the oil and permitting the rubber to absorb the oil.

4. The method of preparing rubber compositions which comprises incorporating from 1 to 3 parts of a mineral oil into 1 part of rubber, immersing the substantially unmasticated crude rubber in the oil until the oil has been absorbed substantially uniformly and completely.

5. A resilient unvulcanized rubber resulting from the absorption of from 1/2 to 3 parts of a softener which has been applied to the surface of 1 part of substantially unmasticated crude sheet rubber.

6. A vulcanized rubber resulting from the vulcanization of a composition comprising a vulcanizing agent and crude rubber which has absorbed, before any substantial mastication, from 1/2 to 3 parts of a softener to 1 part of the rubber.

7. A vulcanized rubber resulting from the vulcanization of a composition comprising a vulcanizing agent and crude rubber which has absorbed, before any substantial mastication, from 1/2 to 3 parts of a mineral oil to 1 part of the rubber.

8. The method of preparing rubber compositions which comprises preparing a master-batch of crude rubber and softener by absorbing from 1/2 to 3 parts of the liquid softener in 1 part of the rubber before any substantial mastication of the rubber, and mixing the said master-batch with another quantity of rubber by mastication.

9. The method of preparing rubber compositions which comprises incorporating one-half part of a liquid softener into one part of rubber, applying the softener to the surface of the substantially unmasticated crude rubber, and permitting the rubber to absorb the softener.

10. A resilient unvulcanized rubber resulting from the absorption of one-half part of a softener which has been applied to the surface of one part of substantially unmasticated crude sheet rubber.

WILLIAM F. ZIMMERLI.
WALDO L. SEMON.